(12) United States Patent
Zhou

(10) Patent No.: US 11,686,979 B2
(45) Date of Patent: Jun. 27, 2023

(54) SEALANT STRUCTURE AND METHOD OF FABRICATING DISPLAY PANEL

(71) Applicant: SHENZHEN CHINA STAR OPTOELECTRONICS SEMICONDUCTOR DISPLAY TECHNOLOGY CO., LTD., Shenzhen (CN)

(72) Inventor: Mingjun Zhou, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/615,692

(22) PCT Filed: Nov. 6, 2019

(86) PCT No.: PCT/CN2019/115841
§ 371 (c)(1),
(2) Date: Apr. 22, 2022

(87) PCT Pub. No.: WO2021/012467
PCT Pub. Date: Jan. 28, 2021

(65) Prior Publication Data
US 2022/0269117 A1  Aug. 25, 2022

(30) Foreign Application Priority Data

Jul. 19, 2019 (CN) .......................... 201910655722.3

(51) Int. Cl.
*G02F 1/1339* (2006.01)

(52) U.S. Cl.
CPC ................................. *G02F 1/1339* (2013.01)

(58) Field of Classification Search
None
See application file for complete search history.

(56) References Cited

U.S. PATENT DOCUMENTS

2010/0258346 A1  10/2010  Chen et al.
2013/0286320 A1  10/2013  Kuo et al.

FOREIGN PATENT DOCUMENTS

| CN | 102645767 A | 8/2012 |
| CN | 204143122 U | 2/2015 |
| CN | 104698690 A | 6/2015 |
| CN | 205740875 U | 11/2016 |
| CN | 107340652 A | 11/2017 |
| CN | 109377869 A | 2/2019 |
| CN | 208796583 U | 4/2019 |
| CN | 110379299 A | 10/2019 |

*Primary Examiner* — Richard H Kim
(74) *Attorney, Agent, or Firm* — Benesch, Friedlander, Coplan & Aronoff LLP

(57) ABSTRACT

A sealant structure and a method of fabricating a display panel are provided. The sealant structure including a plurality of adhesive strips and a plurality of filling colloids, wherein the adhesive strips are disposed end to end, and a gap is disposed between any two adjacent adhesive strips, the filling colloids are disposed in the gaps; wherein the adhesive strips and the filling colloids form a closed loop.

9 Claims, 3 Drawing Sheets

SEALANT STRUCTURE AND METHOD OF FABRICATING DISPLAY PANEL

CROSS REFERENCE TO RELATED APPLICATION

This application claims the priority of International Application No. PCT/CN2019/115841, filed on 2019 Nov. 6, which claims priority to Chinese Application No. 201910655722.3, filed on 2019 Jul. 19. The entire disclosures of each of the above applications are incorporated herein by reference.

BACKGROUND OF INVENTION

Field of Invention

The present invention relates to the field of electronic display, and in particular, to a sealant and a method of fabricating a display panel.

Description of Prior Art

In the prior art, a body and a cover glass of a display panel are usually bonded by thermoplastic glues, which are flexible solids at room temperature and have a low viscosity. Adhesive strips of the thermoplastic glues can be melted after being heated and solidified to a high viscosity solid after the temperature is lowered. In the prior art, for a display panel having a rectangular structure, in order to save cost, the adhesive strips for bonding display panels are usually formed by four spliced adhesive strips. As frame width of the display panels is gradually reduced, width of the adhesive strips is also reduced, therefore higher requirements are imposed on stitching precision of the adhesive strips.

Technical Problems

Referring to FIG. 1, if gaps between the adhesive strips are too large, the melted adhesive strips would not be able to fill the gaps, which may result in the display panel being unsealed. If overlap area of the adhesive strips overlap is too large, the adhesive strips in the overlap area would be too thick to melt completely and form a splicing gap, which may also result in the display panel being unsealed.

SUMMARY OF INVENTION

In order to solve the above problems, the present application provides a sealant structure and a method of fabricating a display panel to solve the technical problem that the display body and the cover plate cannot be sealed.

The application provides a sealant structure comprising a plurality of adhesive strips and a plurality of filling colloids, wherein the adhesive strips are disposed end to end, and a gap is disposed between any two adjacent adhesive strips, the filling colloids are disposed in the gaps;

wherein the adhesive strips and the filling colloids form a closed loop.

According to one aspect of the application, wherein the adhesive strips have a same width.

According to one aspect of the application, wherein a width of each gap is less than or equal to twice a width of the adhesive strips.

According to one aspect of the application, wherein the filling colloids have fluidity before curing, and a volume of each filling colloid after curing is larger than a volume of a gap in which the filling colloid is disposed.

According to one aspect of the application, wherein the filling colloids are curable adhesive.

According to one aspect of the application, wherein the curable adhesive is an ultraviolet curable adhesive.

According to one aspect of the application, wherein a material forming the adhesive strips is a thermoplastic adhesive.

According to one aspect of the application, wherein the thermoplastic adhesive comprises a combination of one or more of polyvinyl acetate, polyvinyl acetal, ethylene-vinyl acetate copolymer resin, vinyl chloride-vinyl acetate copolymer resin, perchloroethylene resin, polyacrylate, polyamide and polysulfone.

According to one aspect of the application, wherein the sealant structure is rectangular, the adhesive strips forming the sealant structure comprises a first adhesive strip, a second adhesive strip, a third adhesive strip and a fourth adhesive strip, four gaps are disposed between the first adhesive strip, the second adhesive strip, the third adhesive strip and the fourth adhesive strip.

The present application further provides a method of fabricating a display panel, wherein the method comprises the steps of:

providing a display body, wherein the display body comprises a display area and a non-display area surrounding the display area;

providing a plurality of adhesive strips on the non-display area, the adhesive strips are adjacent to each other, and a gap is disposed between any two adjacent adhesive strips;

providing a plurality of filling colloids in the gaps, the strips and the filling colloids forming a closed loop;

heating to melt and deform the adhesive strips to form an adhesive unit;

curing and cooling the adhesive unit to form a sealed space by a cover plate and the display body.

Beneficial Effects

The application optimizes the shape of the adhesive strips, and sets a gap between two adhesive strips, the filling colloids are disposed in the gaps, thereby eliminating an overlapping region between two adjacent adhesive strips and avoiding the situation that the strips cannot be melted due to uneven heating. At the same time, a width of the gaps is much larger than a width of the adhesive strips, thereby a tolerance range for pasting is large, an alignment precision of the adhesive strip is low, thus the adhesive strips are easy to paste. The technical solution of the present application can optimize the sealing effect of the display panel without increasing the difficulty of the process.

DETAILED DESCRIPTION OF PREFERRED EMBODIMENTS

Figure 1:
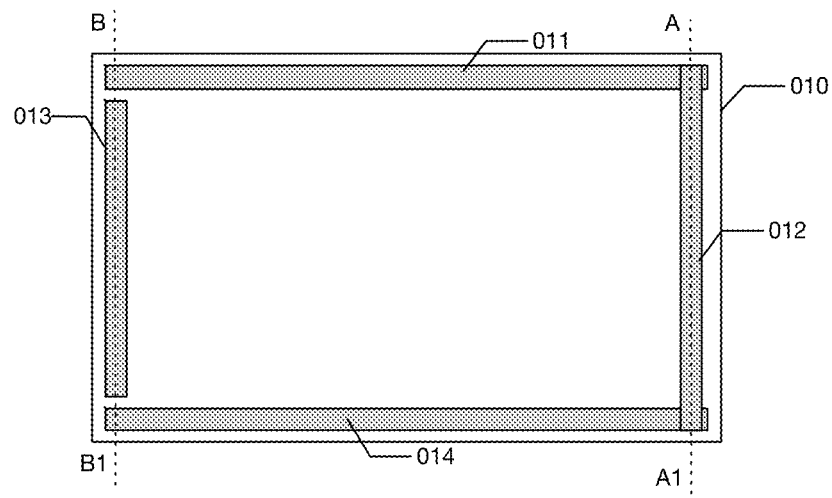
FIG. 1 is a structural diagram of a display body and a sealant structure in the prior art.

Description of following embodiment, with reference to accompanying drawings, is used to exemplify specific embodiments which may be carried out in the present disclosure. Directional terms mentioned in the present disclosure, such as "top", "bottom", "front", "back", "left", "right", "inside", "outside", "side", etc., are only used with reference to orientation of the accompanying drawings. Therefore, the directional terms are intended to illustrate, but not to limit, the present disclosure. In the drawings, components having similar structures are denoted by same numerals.

First, the prior art will be briefly described. Referring to FIG. 1, a display panel includes a substrate 010 and a first adhesive strip 011, a second adhesive strip 012, a third adhesive strip 013, and a fourth adhesive strip 014 on the substrate 010. The first adhesive strip 011, the second adhesive strip 012, the third adhesive strip 013, and the fourth adhesive strip 014 are disposed around edges of the substrate 010.

In the prior art, the adhesive strips are thermoplastic glues, which are flexible solids at room temperature and have a low viscosity. Adhesive strips of thermoplastic glues can be melted after being heated and solidified to a high viscosity solid after the temperature is lowered. Because the adhesive strips are soft and susceptible to deformation during splicing, when pasted onto the substrate 010, lengths of the adhesive strips are easily changed by an external force, thereby generating gaps or overlapping between adjacent adhesive strips.

Figure 2:
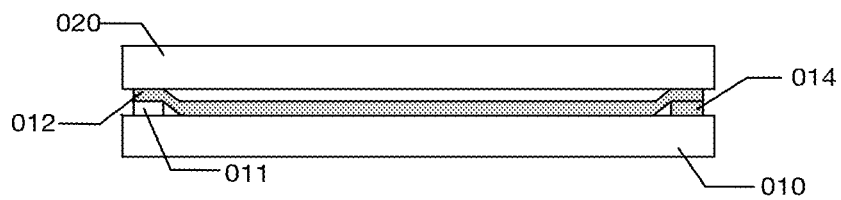
FIG. 2 is a cross-sectional view taken along a direction of AA1 in FIG. 1.
Figure 3:
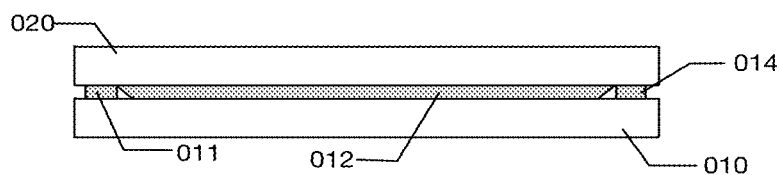
FIG. 3 is a cross-sectional view of a display panel after adhesive strips in FIG. 2 are fused.

Referring to FIG. 2, the second adhesive strip 012 overlaps with the adjacent first adhesive strip 011 and the fourth adhesive strip 014. Widths of overlapping regions are equal to widths of the first adhesive strip 011 and the fourth adhesive strip 014. When bonding with a cover plate 020, thicknesses of the overlap regions are too thick, resulting in uneven heat distribution of the adhesive strips. The adhesive strips near the overlap regions cannot be melted, forming an air passage between adjacent adhesive strips, as shown in FIG. 3.

Figure 4:
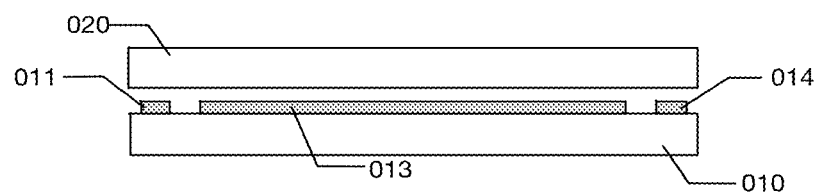
FIG. 4 is a cross-sectional view taken along a direction of BB1 of FIG. 1.
Figure 5:
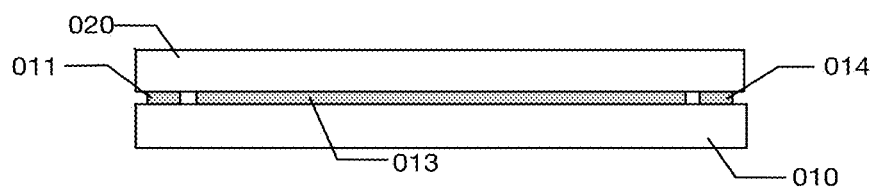
FIG. 5 is a cross-sectional view of a display panel after adhesive strips in FIG. 4 are fused.

Referring to FIG. 4, large gaps exist between the third adhesive strip 013 and the first adhesive strip 011 and the fourth adhesive strip 014 adjacent to the third adhesive strip 013. Because widths of the gaps are too large, the melted adhesive strips cannot completely fill the gaps, resulting in an air passage between adjacent adhesive strips, as shown in FIG. 5.

In order to solve the above problems, the present application provides a sealant structure and a method of fabricating a display panel to solve the technical problem that the display body and the cover plate cannot be sealed.

Figure 8:
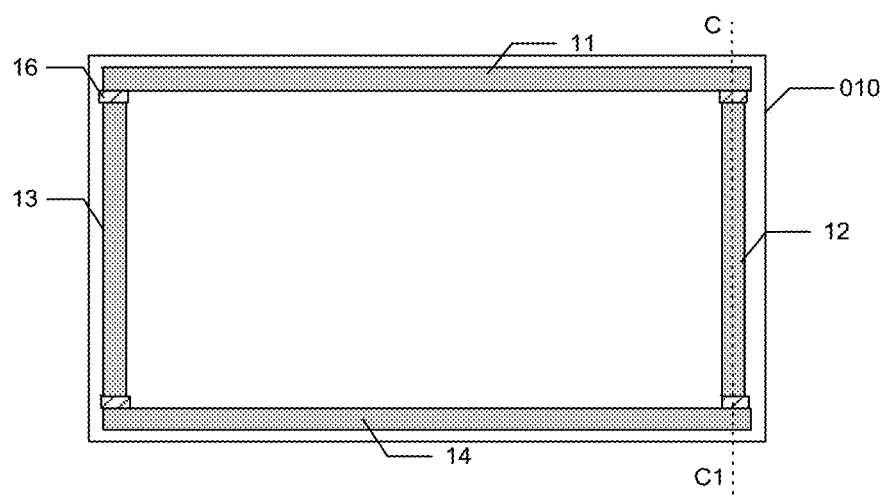
FIG. 8 is a structural diagram of a display panel after filling colloids is disposed in gaps of the adhesive strips.
Figure 9:
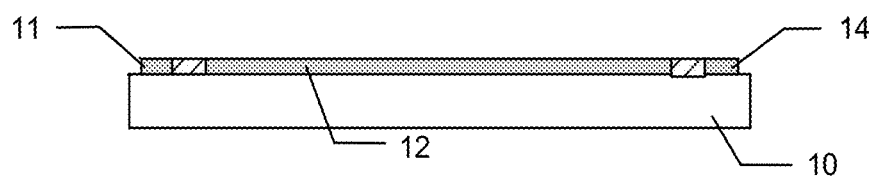
FIG. 9 is a cross-sectional view taken along a direction of CC1 of FIG. 8.
Figure 10:
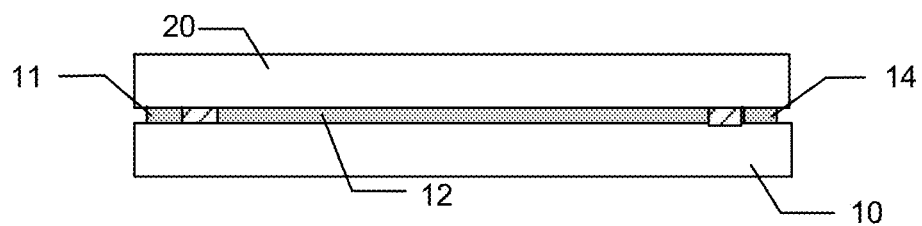
FIG. 10 is a cross-sectional view of the display panel of FIG. 9 after bonding with a cover plate.

Referring to FIG. 8, FIG. 9, and FIG. 10, the sealant structure is used to bond a display body 10 and a cover plate 20. The display body 10 includes a display area and a non-display area surrounding the display area. The sealant structure is disposed on the non-display area. The cover plate 20 is attached to the display body 10 by a adhesive unit consisted of a sealant structure. The cover plate 20 and the display body 10 form a sealed space.

The sealant structure including a plurality of adhesive strips and a plurality of filling colloids 16, wherein the adhesive strips are disposed end to end, and a gap 15 is disposed between any two adjacent adhesive strips, the filling colloids 16 are disposed in the gaps. The adhesive strips and the filling colloids 16 form a closed loop.

The present application provides gaps 15 between adjacent adhesive strips to avoid overlapping of adjacent adhesive strips. Because the overlapping regions are eliminated, the present application can avoid an air passage formed in the prior art due to uneven melting of the adhesive strips. At the same time, the present application eliminates the possibility of air passages in the adhesive unit by providing filling colloids 16 in the gaps 15 to form a closed loop of the adhesive strips and the filling colloids.

In this embodiment, a rectangular sealant structure is taken as an example for description. Correspondingly, a number of the adhesive strips is four. It should be noted that the shape of the sealant structure and the number of adhesive strips in the present embodiment are only for explaining the present invention and are not to be construed as limiting the present invention.

Figure 6:
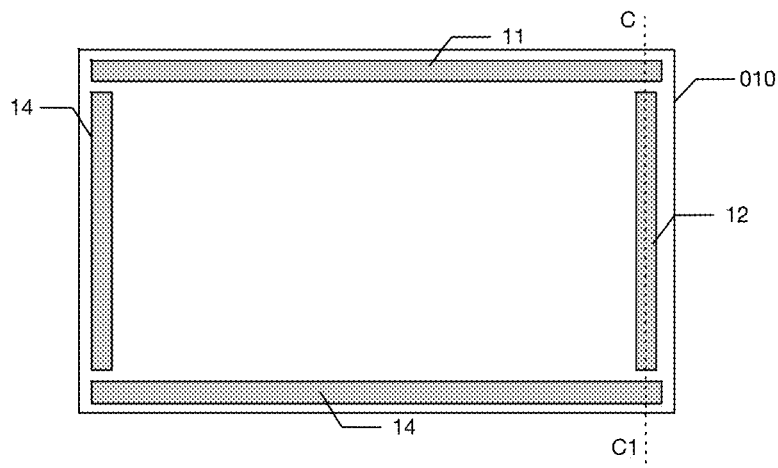
FIG. 6 is a structural diagram of a display panel and adhesive strips in a first embodiment of the present application.
Figure 7:
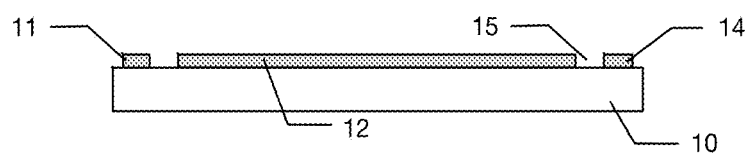
FIG. 7 is a cross-sectional view taken along a direction of CC1 of FIG. 6.

Referring to FIG. 6 and FIG. 7, the sealant structure is rectangular, adhesive strips forming the sealant structure comprises a first adhesive strip 11, a second adhesive strip 12, a third adhesive strip 13, and a fourth adhesive strip 14. Wherein the first adhesive strip 11, the second adhesive strip 12, the third adhesive strip 13, and the fourth adhesive strip 14 have a same width. Wherein four gaps are disposed between the first adhesive strip 11, the second adhesive strip 12, the third adhesive strip 13, and the fourth adhesive strip 14.

Generally, an adhesion of the filling colloids 16 is less than an adhesion of the adhesive strips. In order to avoid that space occupied by the filling colloids 16 is too large and decreasing the adhesion of the sealant structure, a volume of the gaps 15 needs to be limited. At the same time, the adhesive strips are flexible, which is easy to deform when sticking. Thereby the smaller the width of the gaps 15 are, the higher the operational precision is required, and the more difficult for operating. In order to reduce the difficulty of operation while ensuring the adhesion of the adhesive unit, in the present embodiment, the width of each of the gaps 15 is less than or equal to twice the width of the strip.

Typically, the strips have a width ranging from 3 mm to 10 mm, and for a narrow frame structure, the strips typically have a width of 3 mm. Therefore, the maximum width of the gaps 15 between two adjacent strips is typically no greater than 5 mm. In order to ensure that the gaps 15 are completely filled, in the present application, the filling colloids 16 have an initial state and a final state. In the initial state, the filling colloids 16 are in a liquid state, and in the final state, the filling colloids 16 are in a solid state. Preferably, the filling colloid 16 is a curable adhesive such as a UV curable adhesive.

The filling colloids 16 in a liquid state have better fluidity and can completely fill the gaps 15. Thereafter, the filling colloids 16 in the initial state is treated, for example, by light, heating, or the like, to make the filling colloids 16 solid and form the final filling colloids 16. The properties and adhesion of the filling colloids 16 after curing are stable, and filling the gaps 15 completely.

In the present embodiment, to ensure the filling colloids 16 can fulfill the gaps 15 completely, a volume of each filling colloid 16 after curing is larger than a volume of a gap 15 in which the filling colloid 16 is disposed. In the present embodiment, the filling colloids are curable adhesive, such as an ultraviolet curable adhesive. A material forming the adhesive strips is a thermoplastic adhesive. The thermoplastic adhesive is selected from a combination of one or more of polyvinyl acetate, polyvinyl acetal, ethylene-vinyl acetate copolymer resin, vinyl chloride-vinyl acetate copolymer resin, perchloroethylene resin, polyacrylate, polyamide and polysulfone.

Referring to FIG. 6 to FIG. 10, the present application further provides a method of fabricating a display panel, wherein the method comprises the following steps.

In this embodiment, a rectangular sealant structure is taken as an example for description. Correspondingly, a number of the adhesive strips is four. It should be noted that the shape of the sealant structure and the number of adhesive strips in the present embodiment are only for explaining the present invention and are not to be construed as limiting the present invention.

First, providing a display body 10, which includes a display area and a non-display area surrounding the display area. Then referring to FIG. 6 and FIG. 7, disposing a first adhesive strip 11, a second adhesive strip 12, a third adhesive strip 13, and a fourth adhesive strip 14 on the non-display area. Wherein the first adhesive strip 11, the second adhesive strip 12, the third adhesive strip 13, and the fourth adhesive strip 14 are disposed end to end, and a gap is disposed between any two adjacent adhesive strips.

Then referring to FIG. 8 and FIG. 9, a plurality of filling colloids 16 are disposed in the gaps 15, and the first adhesive strip 11, the second adhesive strip 12, the third adhesive strip 13, and the fourth adhesive strip 14 and the plurality of filling colloids 16 form a closed loop.

In order to ensure that the gaps 15 are completely filled, in the present application, the filling colloids 16 have an initial state and a final state. In the initial state, the filling colloids 16 are in a liquid state, and in the final state, the filling colloids 16 are in a solid state. Preferably, the filling colloid 16 is a curable adhesive such as a UV curable adhesive.

The filling colloids 16 in a liquid state have better fluidity and can completely fill the gaps 15. Thereafter, the filling colloids 16 in the initial state is treated, for example, by light, heating, or the like, to make the filling colloids 16 solid and form the final filling colloids 16. The properties and adhesion of the filling colloids 16 after curing are stable, and filling the gaps 15 completely.

Then heating to melt and deform the first adhesive strip 11, the second adhesive strip 12, the third adhesive strip 13, and the fourth adhesive strip 14 to form an adhesive unit, fulfill the gaps 15 between the cover plate 20 and the display body 10.

Then curing and cooling the adhesive unit to form a sealed space by the cover plate 20 and the display body 10.

The application optimizes the shape of the adhesive strips, and sets a gap between two adhesive strips, the filling colloids are disposed in the gaps, thereby eliminating an overlapping region between two adjacent adhesive strips and avoiding the situation that the strips cannot be melted due to uneven heating. At the same time, a width of the gaps is much larger than a width of the adhesive strips, thereby a tolerance range for pasting is large, an alignment precision of the adhesive strip is low, thus the adhesive strips are easy to paste. The technical solution of the present application can optimize the sealing effect of the display panel without increasing the difficulty of the process.

As is understood by persons skilled in the art, the foregoing preferred embodiments of the present disclosure are illustrative rather than limiting of the present disclosure. It is intended that they cover various modifications and that similar arrangements be included in the spirit and scope of the present disclosure, the scope of which should be accorded the broadest interpretation so as to encompass all such modifications and similar structures.

What is claimed is:

1. A sealant structure comprising a plurality of adhesive strips and a plurality of filling colloids, wherein the adhesive strips are disposed end to end, and a gap is disposed between any two adjacent adhesive strips, the filling colloids are disposed in the gaps;
   wherein the adhesive strips and the filling colloids form a closed loop; and
   the filling colloids have fluidity before curing, and a volume of each filling colloid after curing is larger than a volume of a gap in which the filling colloid is disposed.

2. The sealant structure according to claim 1, wherein the adhesive strips have a same width.

3. The sealant structure according to claim 2, wherein a width of each gap is less than or equal to twice a width of the adhesive strips.

4. The sealant structure according to claim 1, wherein the filling colloids are curable adhesive.

5. The sealant structure according to claim 4, wherein the curable adhesive is an ultraviolet curable adhesive.

6. The sealant structure according to claim 1, wherein a material forming the adhesive strips is a thermoplastic adhesive.

7. The sealant structure according to claim 6, wherein the thermoplastic adhesive comprises a combination of one or more of polyvinyl acetate, polyvinyl acetal, ethylene-vinyl acetate copolymer resin, vinyl chloride-vinyl acetate copolymer resin, perchloroethylene resin, polyacrylate, polyamide and polysulfone.

8. The sealant structure according to claim 1, wherein the sealant structure is rectangular, the adhesive strips forming the sealant structure comprises a first adhesive strip, a second adhesive strip, a third adhesive strip and a fourth adhesive strip, four gaps are disposed between the first adhesive strip, the second adhesive strip, the third adhesive strip, and the fourth adhesive strip.

9. A method of fabricating a display panel, wherein the method comprises the steps of:
   providing a display body, wherein the display body comprises a display area and a non-display area surrounding the display area;
   providing a plurality of adhesive strips on the non-display area, the adhesive strips are adjacent to each other, and a gap is disposed between any two adjacent adhesive strips;
   providing a plurality of filling colloids in the gaps, the strips and the filling colloids forming a closed loop;
   heating to melt and deform the adhesive strips to form an adhesive unit; and
   curing and cooling the adhesive unit to form a sealed space by a cover plate and the display body.

* * * * *